E. F. FISHER.
FLUID FLOW INDICATING MECHANISM.
APPLICATION FILED JULY 11, 1914.
1,215,135.
Patented Feb. 6, 1917.
2 SHEETS—SHEET 2.
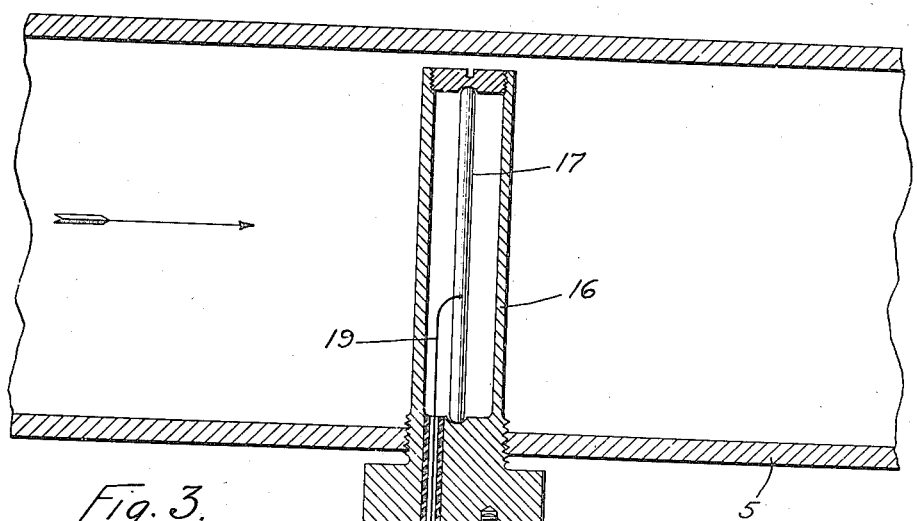
Fig. 3.
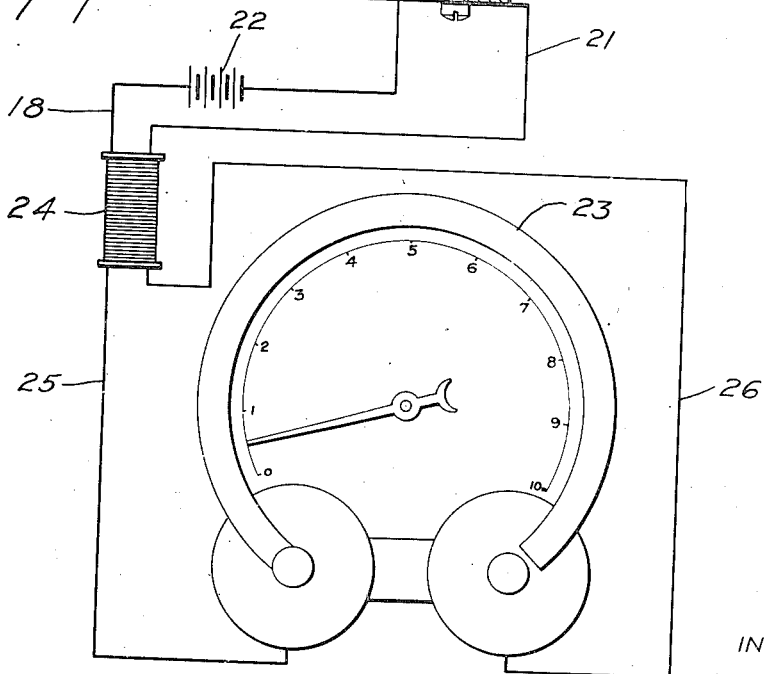

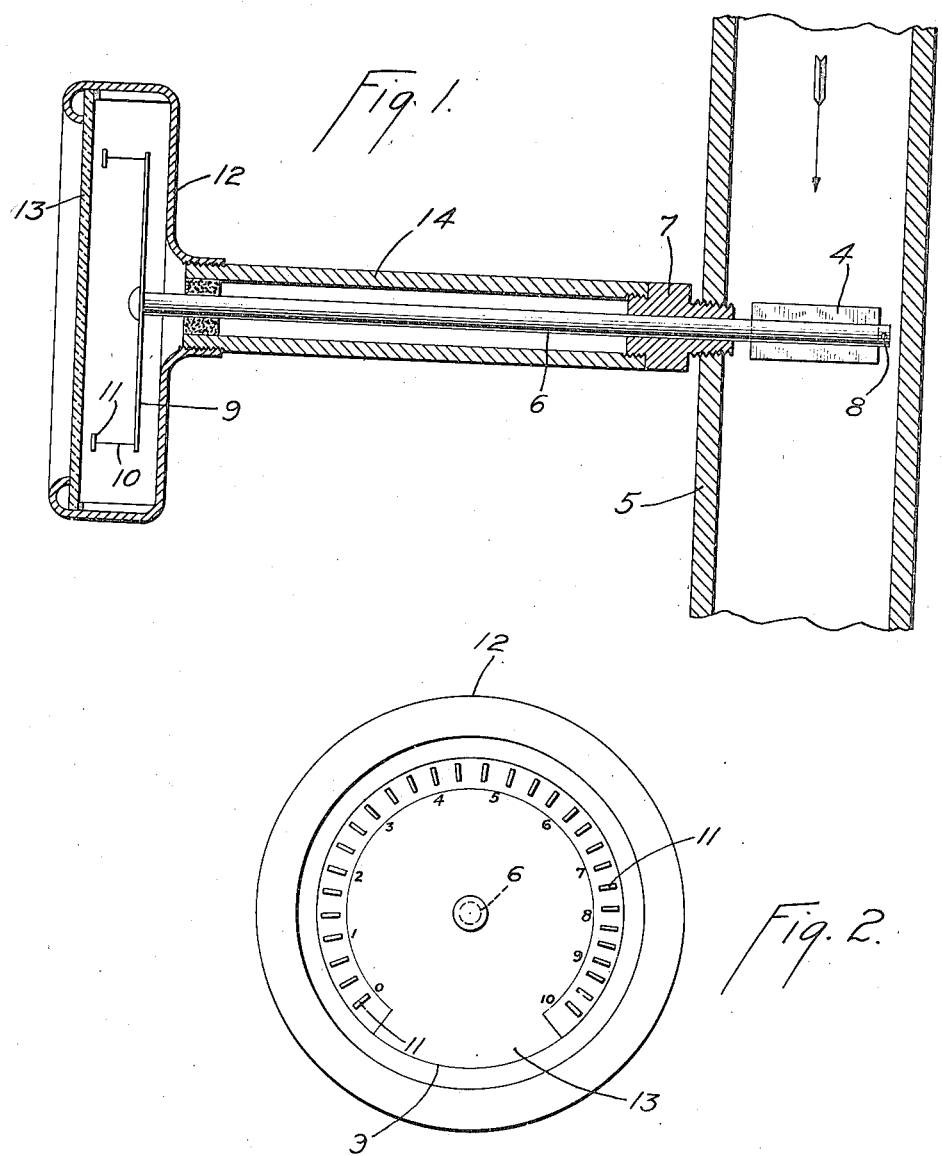

UNITED STATES PATENT OFFICE.

ERNEST F. FISHER, OF PITTSBURGH, PENNSYLVANIA, ASSIGNOR TO GENERAL ELECTRIC COMPANY, A CORPORATION OF NEW YORK.

FLUID-FLOW-INDICATING MECHANISM.

1,215,135.  Specification of Letters Patent.  Patented Feb. 6, 1917.

Application filed July 11, 1914. Serial No. 850,447.

*To all whom it may concern:*

Be it known that I, ERNEST F. FISHER, a citizen of the United States, and a resident of Pittsburgh, in the county of Allegheny and State of Pennsylvania, have made a new and useful Invention in Fluid-Flow-Indicating Mechanism, of which the following is a specification.

This invention relates to fluid flow indicating mechanisms or meters and has for an object to produce an improved mechanism of this character, which is of simple construction and is effective and accurate in operation.

This and other objects I obtain by means of mechanisms embodying the features herein described and illustrated in the drawings accompanying and forming a part hereof.

In the drawings Figure 1 is a transverse sectional view of an indicating mechanism embodying my invention, shown in connection with a fragmental sectional view of a pipe or passage through which the fluid, the velocity of which is to be ascertained, is adapted to pass.

Fig. 2 is a front elevation of the indicating device shown in Fig. 1.

Fig. 3 is a somewhat diagrammatic view of a modified form of my invention shown in connection with a sectional view of a fluid delivery pipe or passage, portions of the mechanism are shown in section for convenience of illustration.

It is an established principle that vibrations will be set up in fluid flowing past a stationary object and that the periodicity of the vibrations will be proportional to the velocity of flow of the fluid. It is also a known fact that the vibrations set up in the fluid will occasion vibrations in the walls of the fluid passage, and in the object which occasions the vibrations in the fluid by extending across its path of flow. It is also a known fact that the vibrations so set up may be absolutely independent of the natural periodicity of the object to which they are transmitted.

In carrying out my invention I employ means for ascertaining the periodicity of the vibrations so occasioned in a stationary object for the purpose of ascertaining the velocity of the fluid occasioning the vibrations.

I find that it is desirable, although I do not know that it is essential, to employ an object, for occasioning the vibrations in the fluid and for transmitting these vibrations to an indicating apparatus, which has a natural periodicity materially different from the period of the vibrations set up in the moving fluid. Under such conditions, no sympathetic vibrations will be set up in the object so employed, but it will act merely as a transmitter and not as an independent vibrator.

The apparatus illustrated broadly consists of means, located in a fluid passage or pipe for setting up vibrations in the fluid traversing the pipe, and means for indicating the periodicity of the vibrations so set up.

In Fig. 1 a flat member, such for example as a reed or metal strip 4, is located in a fluid pipe or passage 5 and is mounted on a rod 6, which projects out of the pipe or passage through a plug 7. As illustrated, the rod is notched at its inner end and the reed is locked in the notch and secured in place by any suitable means, such for example, as a pin or rivet 8, employed to clamp the separate portions of the end of the rod in gripping engagement with the reed so that the reed is rigidly secured to the rod and is not capable of independent motion relatively to it.

On the outer end of the rod I secure suitable means for indicating the periodicity of the vibrations set up in the fluid and transmitted from the fluid to the rod through the agency of the reed. Any suitable means for accomplishing this may be employed, such for example as an ordinary tachometer. The tachometer illustrated in the drawings consists of a metal disk 9 having a series of sensitive members 10 located around its circumference. Each sensitive member 10 is in the nature of a tuning fork of a different tone or periodicity from each of the others, and each is provided at its free end with a brightly colored or clearly discernible piece 11, which will not materially affect the vibration of the member on which it is mounted, and will aid in indicating the vibrations of its mounting member. The disk 9 and the members 10 mounted on it are inclosed within a casing 12, which is preferably provided with a transparent face 13 and which may be held in place by means of a sleeve 14 secured to a plug 7 and surrounding the rod 6. The reed 4 will occasion vibrations in the fluid passing it and vibrations will consequently be transmitted through the rod 6 to the disk 9. The amplitude of the vibrations transmitted to the disk may be such that its vibrations are not visible, but the members 10 are so graduated that one will be set in sympathetic vibration by the disk and consequently will amplify the motion imparted to it by the disk to such an extent that the vibrations will be clearly apparent. By so grading the members 10 that they will successively vibrate in response to vibrations of gradually increasing periodicity, the periodicity of the vibrations of the rod 6 or the disk 9 can be readily ascertained and consequently the velocity of the fluid occasioning the vibrations in the rod 6 can be readily computed. In fact, if desired, the tachometer may be provided with a dial graduated so as to indicate the velocity of flow of the fluid traversing the pipe or passage 5. This may be accomplished by so grading the members 10 that each will be set into maximum vibration by a definite velocity of flow of fluid through the passage 5 and a number or character may be set opposite to each member 10 which will indicate the velocity in feet per second, or velocity in any unit of lineal measurement for any unit of time.

In Fig. 3 I have shown a modification of my invention in which I employ electrical means for indicating the periodicity of the vibrations set up in the fluid passing a cylindrical member located in the fluid passage.

As in Fig. 1, fluid is adapted to flow through a passage 5, past a cylindrical plug 16, which projects into the passage and across, or partially across the path of flow of the fluid. The plug 16 is hollow and includes within its interior what may be termed a microphone, which consists of an electrical conductor 17 extending longitudinally of the plug and loosely mounted so that it can move in response to vibrations imparted to the plug and thereby vary the resistance in, or alternately make and break an electrical circuit 18. One lead 19 of the circuit is electrically connected to the member 17, while the other lead 21 is electrically connected to the plug which incloses the member 17. The circuit includes any suitable source of current, such as a battery 22, a frequency indicator 23 of any suitable kind and a transformer 24.

The operation of the apparatus is as follows: Fluid passing the cylindrical plug 16 will be set into vibration with a periodicity dependent upon its velocity. These vibrations will be communicated to the plug and will consequently cause the carbon rod 17 to vibrate and thereby make and break electrical connection between itself and the plug. This will cause alternate makes and breaks in the electrical circuit including the rod and consequently the current flowing through the circuit will pulsate or be intermittent, with the periods of flow corresponding to the periodicity of the vibrations imparted to the carbon rod 17. The frequency of the current pulsations in the circuit will be indicated by the frequency indicator and consequently the indicator will indicate the periodicity of the vibrations set up in the fluid traversing the pipe 5. If desired, the indicator may be calibrated so as to indicate velocity of flow of the fluid through passage 5 since the frequency of the current will vary in direct proportion to the velocity of flow of the fluid.

It will be apparent to those skilled in the art that various means may be employed for setting up the vibrations in the flowing fluid and that vibration may be transmitted to the tachometer in any suitable manner, and that under certain conditions the tachometer may be mounted directly on the fluid pipe and for the purpose of indicating the velocity of flow through the pipe, by indicating the periodicity of the vibrations transmitted to the pipe.

It will also be apparent to those skilled in the art that while I have described and illustrated two embodiments of my inventions, that various modifications, arrangements, substitutions and additions may be made in the apparatus without departing from the spirit and scope of my invention as set forth by the appended claims.

Having thus described my invention, what I claim is:

1. A fluid flow indicating device, comprising a vibration tachometer secured to the walls of the passage, through which fluid is flowing, for indicating the frequency of vibrations occasioned by the fluid traversing the passage.

2. In a flow meter, the combination with a conduit through which a fluid to be metered flows, of a device located in the conduit and responsive to vibrations set up by the flowing fluid, and an indicating mechanism connected to said device.

3. A fluid flow indicating device, comprising a member having a fluid flow passage therethrough, a sensitive member located in said passage to respond to vibrations set up by the passing fluid, a device for indicating the amplitude of such vibrations, and means for transmitting the vibrations to the indicating device.

4. A fluid flow indicating device, comprising a member having a fluid flow passage therethrough, a sensitive member located in said passage to respond to vibrations set up by the passing fluid, a device for indicating the amplitude of such vibrations, and means for transmitting the vibrations to the indicating device, including means for amplifying the vibrations.

In testimony whereof, I have hereunto subscribed my name this 9th day of July, 1914.

ERNEST F. FISHER.

Witnesses:
E. W. McCallister,
B. M. Fero.